United States Patent
Chen et al.

(10) Patent No.: US 10,331,620 B2
(45) Date of Patent: Jun. 25, 2019

(54) FILE GENERATOR

(71) Applicant: International Business Machines Corporation, Armonk, NY (US)

(72) Inventors: Li Jia Chen, Beijing (CN); Nan Chen, Beijing (CN); Yang Liang, Beijing (CN); Qin Qiong Zhang, Beijing (CN); Xue Yong Zhang, Beijing (CN); Jia Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 14/950,510

(22) Filed: Nov. 24, 2015

(65) Prior Publication Data
US 2017/0147568 A1  May 25, 2017

(51) Int. Cl.
| | |
|---|---|
| *G06F 16/11* | (2019.01) |
| *G06F 9/451* | (2018.01) |
| *G06F 16/25* | (2019.01) |
| *G06F 8/30* | (2018.01) |

(52) U.S. Cl.
CPC ............ *G06F 16/116* (2019.01); *G06F 9/451* (2018.02); *G06F 16/258* (2019.01); *G06F 8/30* (2013.01)

(58) Field of Classification Search
CPC combination set(s) only.
See application file for complete search history.

(56) References Cited

U.S. PATENT DOCUMENTS

| | | | |
|---|---|---|---|
| 6,113,649 A * | 9/2000 | Govindaraj | G06F 8/34 717/113 |
| 9,304,724 B2 | 4/2016 | Tsugimura | |
| 9,959,277 B2 | 5/2018 | Gjaltema et al. | |
| 10,095,699 B2 | 10/2018 | Ueda et al. | |
| 2005/0108619 A1 | 5/2005 | Theall et al. | |
| 2007/0140466 A1* | 6/2007 | Sharma | H04M 3/24 379/235 |
| 2008/0243892 A1 | 10/2008 | Little et al. | |
| 2009/0144283 A1* | 6/2009 | Clark | G06F 17/30144 |
| 2010/0269096 A1* | 10/2010 | Araya | G06F 8/71 717/113 |
| 2013/0339889 A1 | 12/2013 | Bastide et al. | |

(Continued)

OTHER PUBLICATIONS

Zhang, et al., "Managing Presentation Slides with Reused Elements", ResearchGate, Retrieved on Jul. 28, 2015, 8 pages.

(Continued)

*Primary Examiner* — Etienne P Leroux
(74) *Attorney, Agent, or Firm* — Christopher K. McLane; Daniel R. Simek (57) ABSTRACT

In an approach for generating a file, a computer opens a first file within application software that includes content. The computer receives an indication to generate a second file based on the opened first file and an indication of a file format for the second file. The computer provides a selection window associated with the second file, wherein the selection window is at least partially transparent and at least partially overlays the opened first file. The computer identifies content within the first file that is overlaid by the provided selection window associated with the second file. The computer transfers a copy of the identified content within the first file that is overlaid by the provided selection window associated with the second file.

18 Claims, 7 Drawing Sheets

(56) References Cited

U.S. PATENT DOCUMENTS

2014/0325349 A1  10/2014  Riherd et al.
2016/0224245 A1   8/2016  Yang et al.

OTHER PUBLICATIONS

IBM, "System, Apparatus and provision to transfer content from an application to another application or File, with preview and preferences," An IP.com Prior Art Database Technical Disclosure, Publication Date: Aug. 20, 2008, IP.com No. 000173659, 6 pages.

* cited by examiner

FILE GENERATOR

BACKGROUND

The present invention relates generally to the field of software applications, and more particularly to generating files associated with another file format within a software application.

With the continued miniaturization of computing resources and advancements in portable battery life, portable computers have grown in popularity. The same developments that spurred the growth of laptop computers and other portable computers have allowed manufacturers to integrate computing resources into cellular phones and handheld computing devices resulting in mobile computing devices (e.g., a smartphone, a personal digital assistant, a tablet, etc.). Mobile computing devices are capable of running a variety of operating systems and thus allow users to perform tasks while in transit.

Users rely on computing devices, mobile computing devices, and telecommunications equipment to produce, store, retrieve, transmit, and manipulate data to produce a work product through productivity software. Productivity software is application software designed to perform a group of coordinated functions, tasks, or activities that produce information, such as documents, presentations, worksheets, databases, charts, graphs, etc. Collections of application software (e.g., software suite) include related functionality that shares a common user interface thus allowing some ability to exchange data amongst the various individual instances of application software. For example, an office suite is a collection of bundled productivity software that includes a word processing program, a spreadsheet program, and a presentation program that is capable of exchanging data amongst the three programs.

Data is exchanged amongst application programs of a software suite and/or with compatible application software through the use of cut, copy, and paste functions associated with a clipboard and a clipboard manager. The clipboard includes functions and messages that enable application software to transfer data between applications and/or within an application. The clipboard manager adds functionality to the clipboard of an operating system by enhancing the basic functions of cut, copy, and paste operations with one or more feature. For example, the clipboard manager includes multiple buffers that merge, split, and edit contents; select the buffer to store data from a cut or copy; select the buffer the paste data should be retrieved from; handle formatted text, tabular data, data objects, media content, and uniform resource locators (URLs); save copied data to long term storage; index and/or tag clipped data; and search saved data.

SUMMARY

Aspects of the present invention disclose a method, computer program product, and system for generating a file. The method includes one or more computer processors opening a first file within application software that includes content. The method further includes one or more computer processors receiving an indication to generate a second file based on the opened first file and an indication of a file format for the second file. The method further includes one or more computer processors providing a selection window associated with the second file, wherein the selection window is at least partially transparent and at least partially overlays the opened first file. The method further includes one or more computer processors identifying content within the first file that is overlaid by the provided selection window associated with the second file. The method further includes one or more computer processors transferring a copy of the identified content within the first file that is overlaid by the provided selection window associated with the second file.

DETAILED DESCRIPTION

Embodiments of the present invention recognize users of computing devices employ the use of cut, copy, and paste functions to transfer data between multiple instances of application software that may include a different file format by implementing a series of steps to switch between the multiple instances of applications and to perform the transfer of data. For example, a user selects content to cut and/or copy within a word processing program, selects a spreadsheet program, identifies a location within the spreadsheet to paste the selection, and selects paste which transfers the data that may then be edited. To make a second selection from the word processing document, the user reselects the word processing program and repeats the process. Embodiments of the present invention also recognize that when transferring data between multiple instances of application software the process to cut, copy, paste, and edit the data can be time consuming and may be difficult depending on the size of the computing device. Embodiments of the present invention create a selection window associated with another file format within an instance of application software. Through the selection window of the present invention, the user selects, transfers, edits, and saves the data in the file format associated with the selection window without necessitating the switching between instances of application software.

Figure 1:
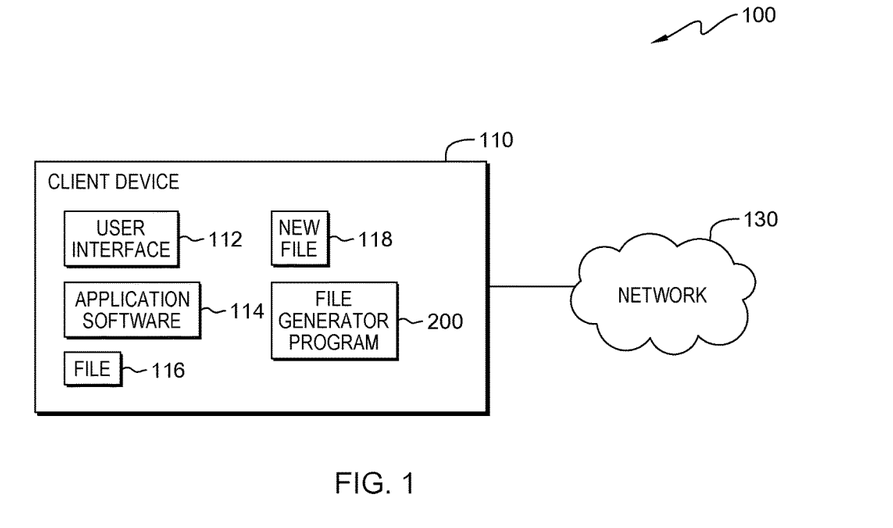
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. FIG. 1 provides only an illustration of one embodiment and does not imply any limitations with regard to the environments in which different embodiments may be implemented.

In the depicted embodiment, data processing environment 100 includes client device 110 connected to network 130. Data processing environment 100 may include additional computing devices, mobile computing devices, servers, computers, storage devices, or other devices not shown.

Client device 110 may be a web server or any other electronic device or computing system capable of processing program instructions and receiving and sending data. In some embodiments, client device 110 may be a laptop computer, a tablet computer, a netbook computer, a personal computer (PC), a desktop computer, a personal digital assistant (PDA), a smart phone, or any programmable electronic device capable of communicating with network 130. In general, client device 110 is representative of any electronic device or combination of electronic devices capable of executing machine readable program instructions as described in greater detail with regard to FIG. 4, in accordance with embodiments of the present invention. Client device 110 contains user interface 112, application software 114, file 116, new file 118, and file generator program 200.

User interface 112 is a program that provides an interface between a user of client device 110 and a plurality of applications that reside on client device 110 (e.g., application software 114, file 116, new file 118, file generator program 200, etc.) and/or may be accessed over network 130. A user interface, such as user interface 112, refers to the information (e.g., graphic, text, sound) that a program presents to a user and the control sequences the user employs to control the program. A variety of types of user interfaces exist. In one embodiment, user interface 112 is a graphical user interface. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. User interface 112 transfers information between application software 114, file 116, new file 118, and file generator program 200.

Application software 114 is a set of one of more programs designed to carry out the operations for a specific application to assist a user to perform an activity (e.g., word processing programs, spread sheet programs, presentation programs, media players, web browsers). For example, application software 114 includes a program that creates, views and/or edits file 116. In the depicted embodiment, application software 114 resides on client device 110. In another embodiment, application software 114 may reside on a server or on another device (not shown) connected over network 130. Application software 114 interacts with file generator program 200 in order to create new file 118. In one embodiment, application software 114 includes file generator program 200 as a plug-in (i.e., adds features available through file generator program 200 to application software 114).

File 116 is a collection of data or information associated with a filename that is accessible by application software 114 (e.g., data files, text files, program files, image files, media files, etc.). For example, file 116 is a word processing file that includes research materials, experiment results, and conclusions. File 116 includes the information to create new file 118 via file generator program 200. In the depicted embodiment, file 116 resides on client device 110. In another embodiment, file 116 resides on a server or another computing device (not shown) connected over network 130 provided file 116 is accessible by application software 114 and file generator program 200.

New file 118 is a collection of data or information resulting from file generator program 200 that is based on file 116; however, new file 118 may include a different file format than file 116. For example, file 116 is a word processing file, and new file 118 is a presentation file highlighting the experiment results and conclusions to present at a conference. In the depicted embodiment, new file 118 resides on client device 110. In another embodiment, new file 118 resides on a server of another computing device (not shown) connected over network 130. In one embodiment, new file 118 is a file that is created and saved at the beginning of file generator program 200. In another embodiment, new file 118 is initially a temporary file that is created by file generator program 200 that a user may save after creation. In some other embodiment, new file 118 may be a previously saved file that is re-opened to add additional content (e.g., continue editing at another time).

Network 130 may be a local area network (LAN), a wide area network (WAN) such as the Internet, a wireless local area network (WLAN), any combination thereof, or any combination of connections and protocols that will support communications between client device 110, server 120, and other computing devices and servers (not shown), in accordance with embodiments of the inventions. Network 130 may include wired, wireless, or fiber optic connections.

File generator program 200 is a program for creating new file 118 from file 116 that may include a different file format. File generator program 200 allows the user, through user interface 112, to select displayed content within an open instance of file 116 through a selection window. File generator program 200 converts the selected displayed content associated with a selected file format, thus creating new file 118. Upon creation of new file 118, file generator program 200 enables editing of new file 118 and selection of additional content from file 116. In the depicted embodiment, file generator program 200 resides on client device 110. In another embodiment, file generator program 200 resides on a server or another computing device (not shown) provided file generator program 200 has access to file 116.

Figure 2:
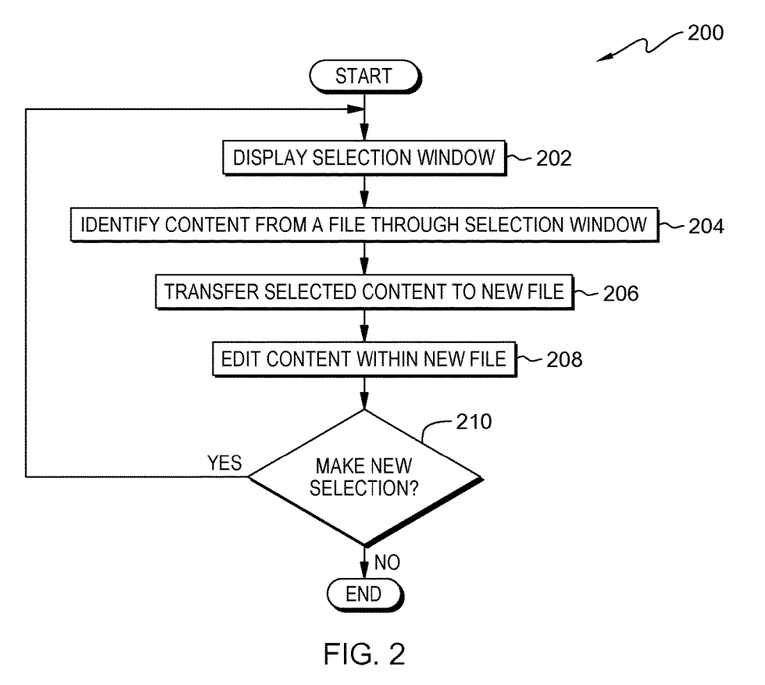
FIG. 2 is a flowchart depicting operational steps of a file generator program, on a computing device within the data processing environment of FIG. 1, for creating a new file based on an existing file, in accordance with an embodiment of the present invention.

FIG. 2 is a flowchart depicting operational steps of file generator program 200, a program for creating new file 118 based on an existing file (e.g., file 116), in accordance with an embodiment of the present invention. In one embodiment, file generator program 200 is a standalone program. In another embodiment, file generator program 200 is a plug-in incorporated within application software 114. Prior to initiating, a user, through user interface 112, opens file 116 through application software 114. In one embodiment, file generator program 200 initiates in response to a user selection of an icon on client device 110 through user interface 112 that represents file generator program 200. For example, a user double taps an icon associated with file generator program 200 and file generator program 200 initiates. In another embodiment, a user, through user interface 112, makes a selection associated with file generator program 200 within application software 114 from a toolbar, drop-down menu, and/or shortcut keys, and file generator program 200 initiates.

In step 202, file generator program 200 displays a selection window overlaying file 116. File generator program 200 provides the user with available file formats through user interface 112. A file format is the standard manner in which information is encoded for storage in a computer file. For example, file generator program 200 displays file formats associated with a presentation format, a document format, a spreadsheet format, and an image format. File generator program 200 receives a selection through user interface 112 from the user indicating the file format for the selection window. In one embodiment, file generator program 200 displays a transparent selection window over file 116 with the corresponding file format (e.g., creates a new instance of new file 118 and/or a new page without prior content included). For example, file generator program 200 displays the selection window as a grid with rows and columns over file 116 when the selected file format is associated with a spreadsheet program (i.e., the selection window with the grid overlays the open instance of file 116). As the selection window is transparent, the user is able to view the underlying content (i.e., overlaid content) prior to making a selection. File generator program 200 adjusts the size of the selection window according to the scale of file 116. In one embodiment, file generator program 200 updates the entirety of the selection window to correspond to the content that is currently viewable.

Figure 3A:
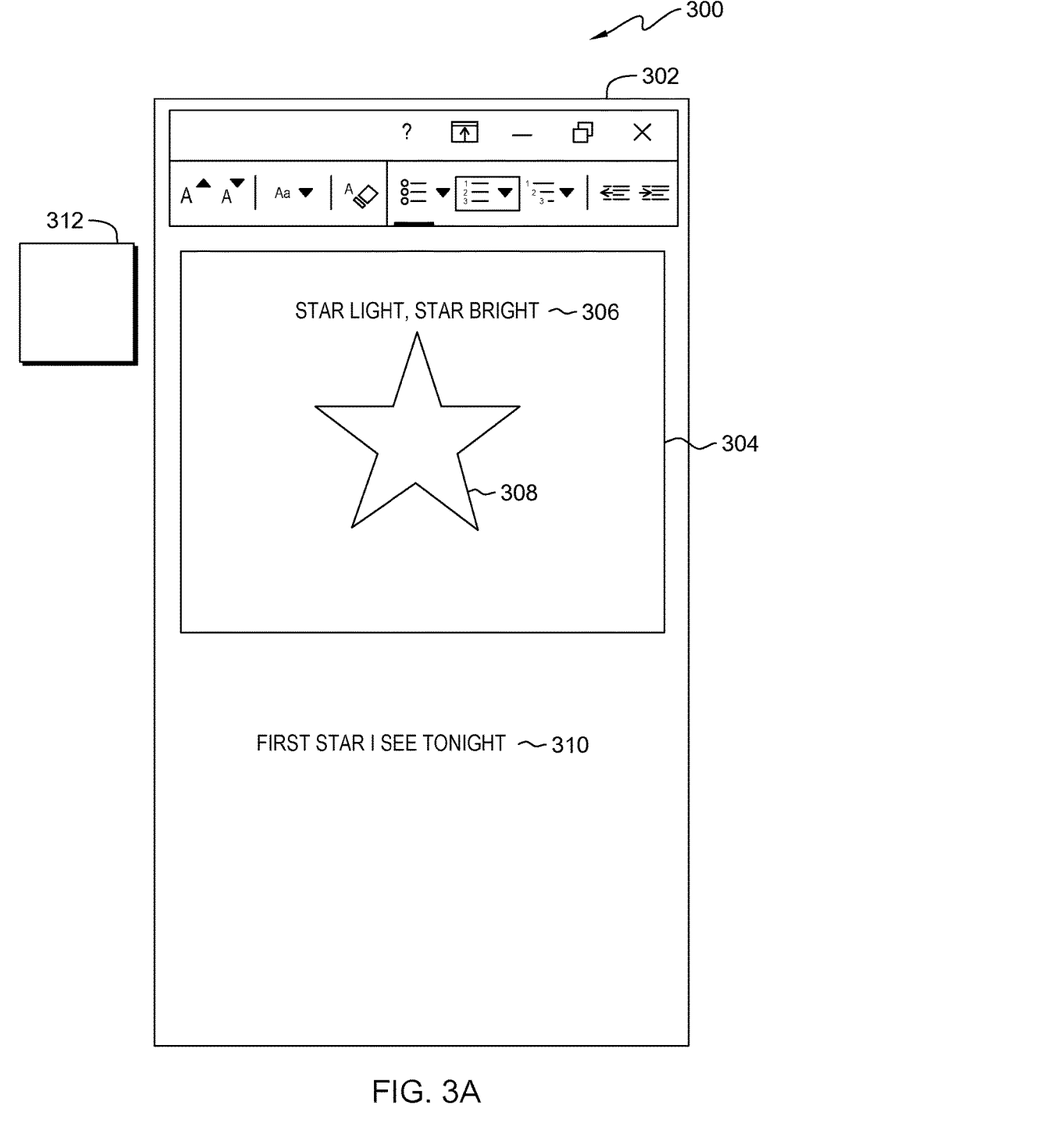
FIG. 3A is an example of the content displayed on a user interface depicting a source application and selected information to convert to a presentation file format, in accordance with an embodiment of the present invention.

As depicted in the example of user interface 300 in FIG. 3A, file generator program 200 initiates the creation of a presentation file from a word processing document. User interface 300 displays application software 302 (e.g., word processing program) and an open instance of file 116 (e.g., word processing document) that includes text 306 (e.g., "Star light, star bright"), image 308 (e.g., star symbol), and text 310 (e.g., "First star I see tonight"). File generator program 200 displays selection window 304 over file 116 that is scaled to the same size as file 116. As selection window 304 is transparent, the underlying content (e.g., overlaid content) within file 116 (e.g., text 306 and image 308) is viewable to the user as the content would appear in new file 118 (e.g., presentation slide 312). Additionally, selection window 304 corresponds to presentation slide 312 (e.g., preview pane), however, presentation slide 312 is blank as file generator program 200 has not received an indication through user interface to transfer text 306 and image 308 to new file 118.

In another embodiment, file generator program 200 displays a partially transparent selection window (e.g., new file 118 is in process and already includes content). In one embodiment, file generator program 200 may display a transparent selection window that includes content transferred to new file 118 that cannot be overwritten by another selection made through the selection window in a different font color. For example, file generator program 200 displays content already in new file 118 in red or black indicating that the content cannot be replaced. In one embodiment, file generator program 200 displays content that can be replaced as a ghosted text (e.g., light grey color). In another embodiment, file generator program 200 displays a border (e.g., dashed line, green, flashes, etc.) around content that can be replaced. In another embodiment, file generator program 200 may display updates to a portion of the selection window associated with new file 118 that cannot be replaced as with a different background (e.g., reduced level of transparency, different background color, etc.) and displays updates to the portion of the selection window that can be replaced by a selection within file 116 as transparent. In some other embodiment, file generator program 200 changes the background color associated with content within new file 118 that cannot be overwritten by another selection.

Figure 3B:
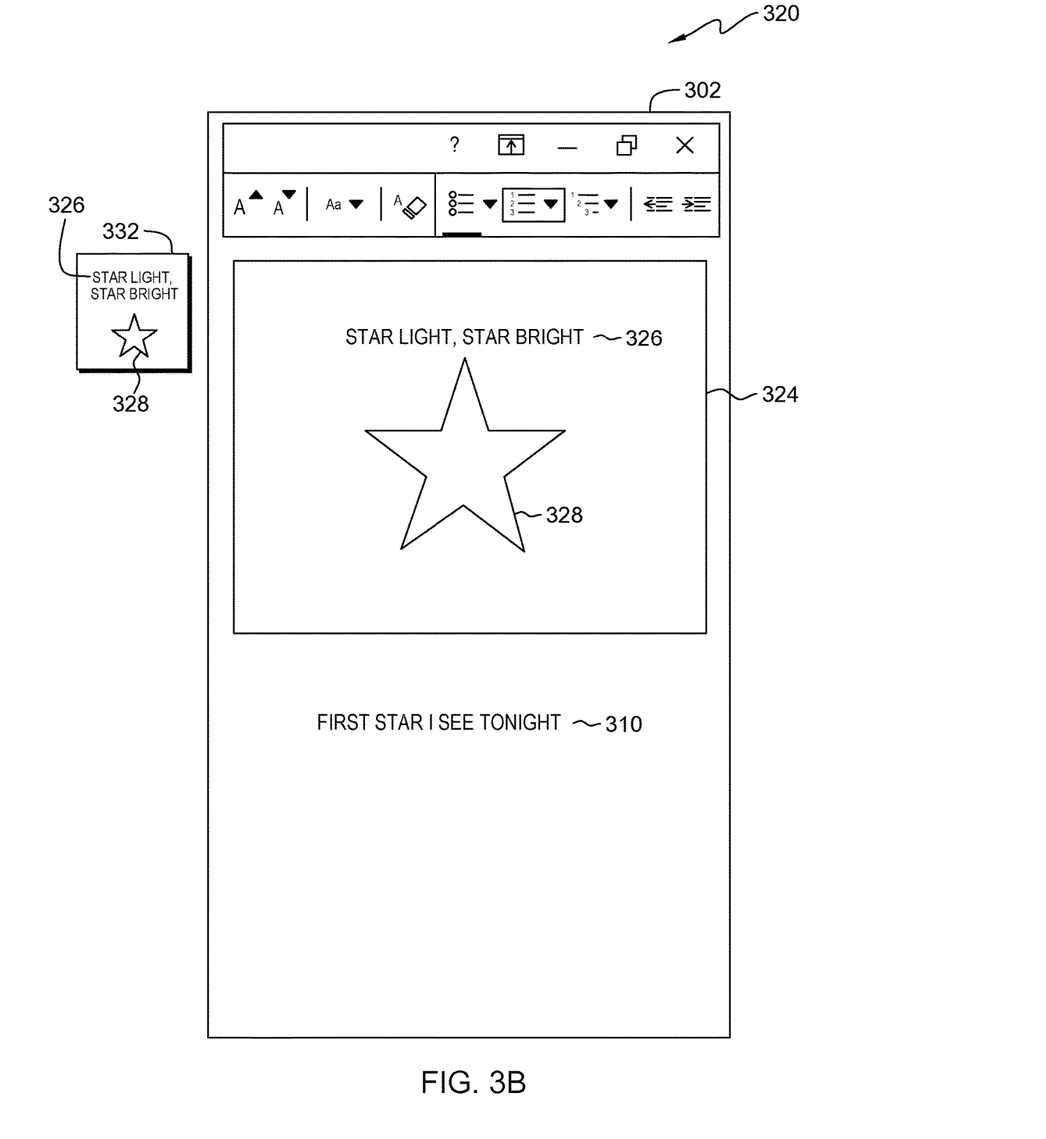
FIG. 3B is an example of the content displayed on a user interface depicting the presentation file that includes the selected information transferred from the source application, in accordance with an embodiment of the present invention.
Figure 3C:
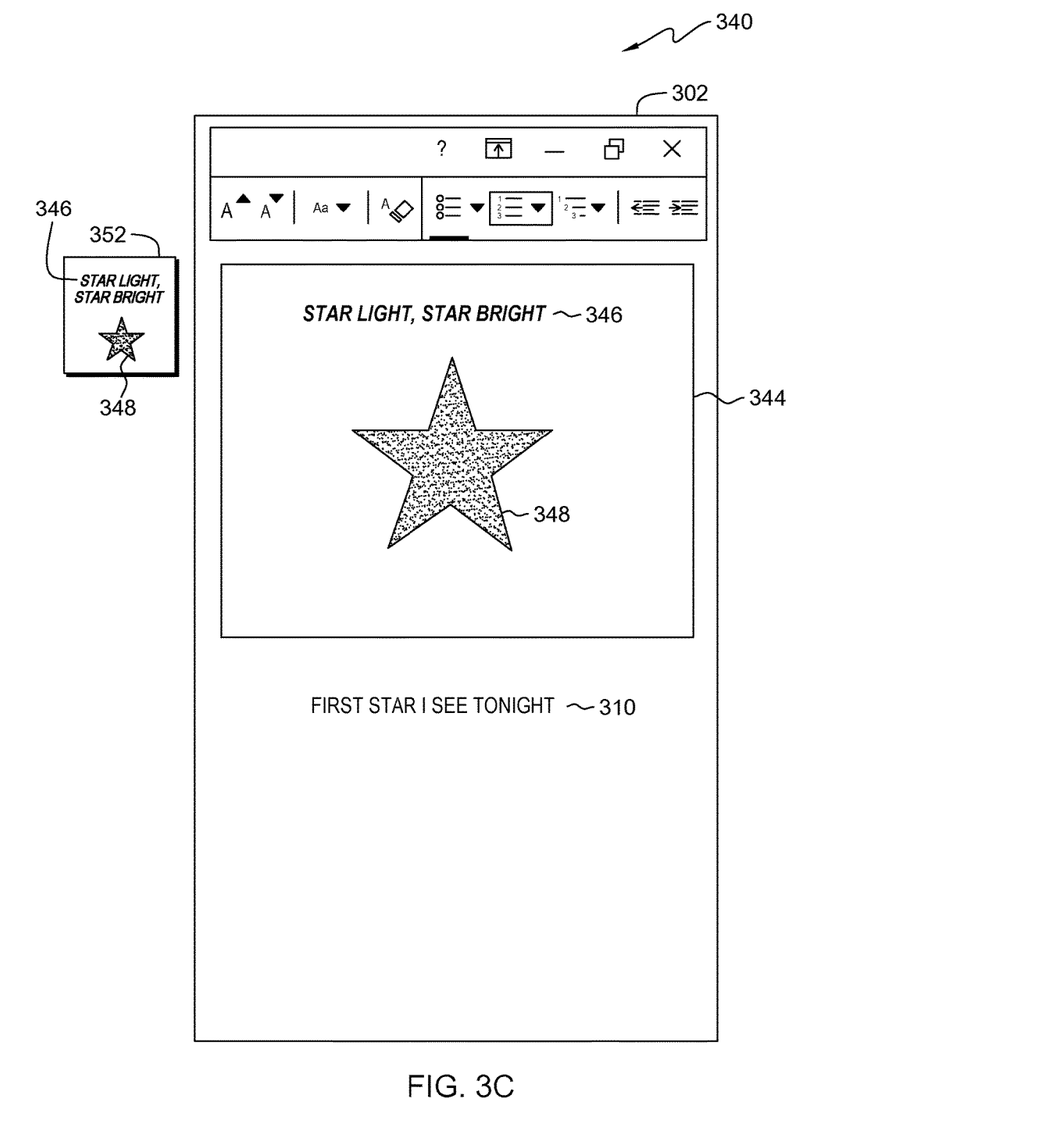
FIG. 3C is an example of the content displayed on a user interface depicting editorial changes to the presentation file, in accordance with an embodiment of the present invention.
Figure 3D:
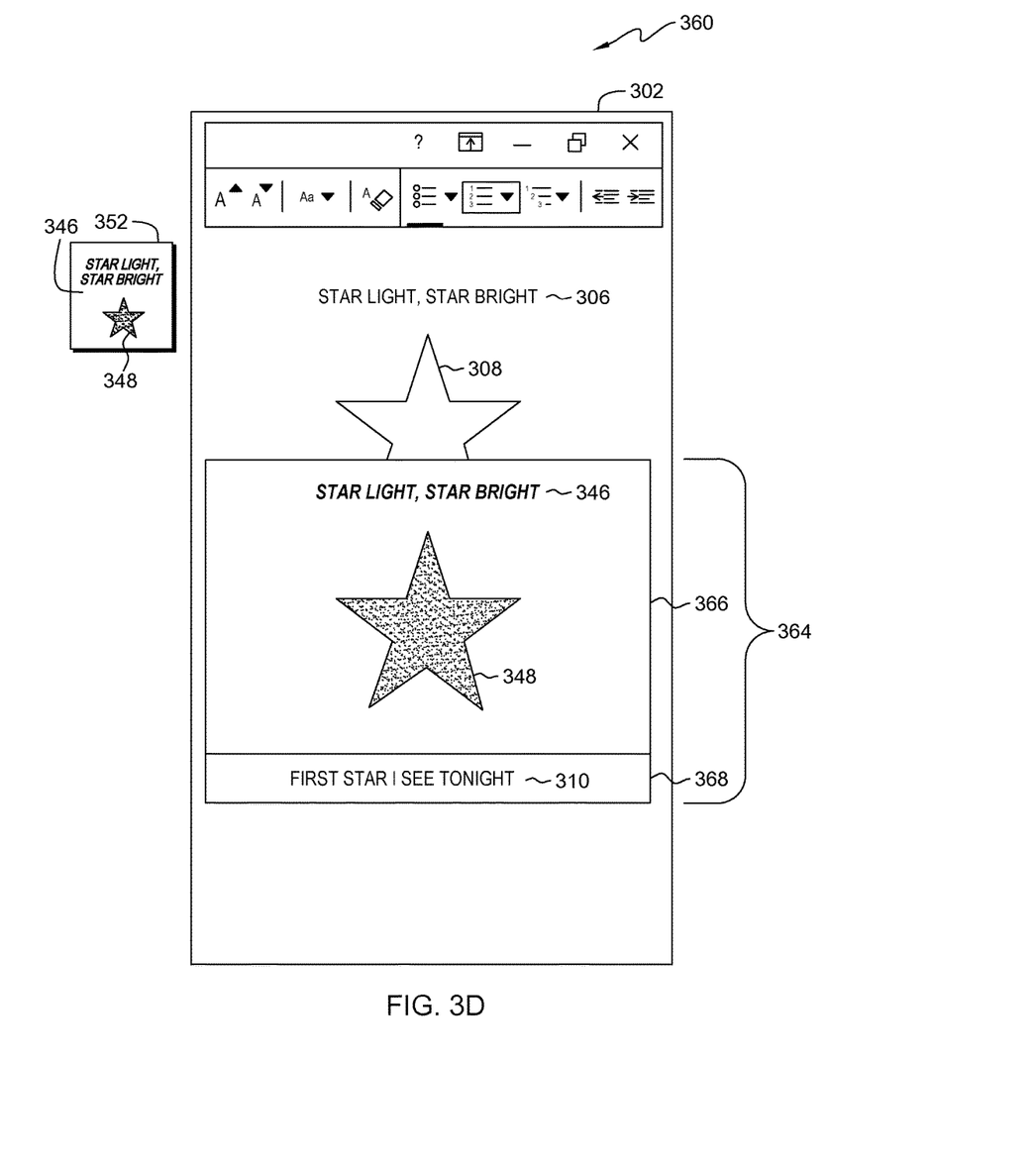
FIG. 3D is an example of the content displayed on a user interface depicting the selection of additional information from a source application to add to the in-process presentation file, in accordance with an embodiment of the present invention.

As depicted in the example of user interface 360 in FIG. 3D file generator program 200 receives an indication through user interface 112 to add another selection to new file 118 (e.g., adds a second selection into new file 344). Through user interface 112, the user moves selection window 364 to include text 310. By moving selection window 364, text 306 and image 308 are uncovered, and maintain the original formatting of file 116 within application software 302 despite changes made to text 346 and image 348 within new file 344. File generator program 200 splits selection window 364 into reserved portion 366, which includes previously added content (e.g., text 346 and image 348) that cannot be replaced, and available portion 368 that is capable of receiving another selection. As reserved portion 366 cannot be replaced, image 308 is partially obscured from view by reserved portion 366. As available portion 368 is empty space, text 310 is visible and thus available for later selection and incorporation. Presentation slide 352 maintains text 346 and image 348, but does not include text 310, as file generator program 200 has not received an indication through user interface 112 to transfer text 310 to new file 344.

In step 204, file generator program 200 identifies content from file 116 through a selection window. As at least a portion of the selection window is transparent, file generator program 200 identifies the content from file 116 as the content directly beneath the transparent portion(s) of the selection window. Through user interface 112, the user may change the content file generator program 200 identifies within the selection window by moving forward or backward within file 116 and/or resizing the selection window. For example, the user scrolls, page advances, etc. within file 116, which changes the content that is under the selection window. In another example, the user, through user interface 112, moves the selection window by selecting and dragging the selection window over another portion of file 116, thus changing the underlying content. Additionally, the user may change the size of the selection window to capture more and/or less text. For example, the user may reduce the size of the selection window to encompass a single line of text within a paragraph of text or enlarge the selection window to capture additional content. File generator program 200 collects information pertaining to the content (e.g., text, images, formatting, etc.) within the selection window for further use. For example, file generator program 200 identifies the words, font, font size, font color, etc., associated with text within file 116 when within the selection window. As the content within the selection window changes, file generator program 200 updates (e.g., synchronizes) the information pertaining to the content to reflect the current content within the selection window.

In step 206, file generator program 200 transfers the selected content to new file 118. File generator program 200 receives an indication from the user through user interface 112 to capture the content within the selection window. For example, the user selects an icon associated with an action to transfer the content within the selection window to new file 118. File generator program 200 notifies application software 114 of the content within the selection window from step 204 (e.g., selects content within file 116 corresponding to the content within the selection window). File generator program 200 initiates a memory copy within application software 114 (e.g., copies selected content). Additionally as part of the selection, file generator program 200 pastes the information from the memory copy to new file 118. In other words, file generator program 200 initiates the selection, copy, and paste of the content within the selection window to new file 118 within a single combination action. File generator program 200 changes the transparency of the background of the selection window associated with content from transparent to a different background (e.g., reduced level of transparency, different background color, etc.) indicating the selection cannot be overwritten. File generator program 200 displays the content and format of new file 118 (e.g., converts the selection window to an active instance of new file 118).

As depicted in the example of user interface 320 in FIG. 3B, file generator program 200 transfers a copy of the content within selection window 304 to new file 324 (e.g., updates new file 118 with the transferred content thus creating new file 324). File generator program 200 transfers the copy of text 306 and image 308 to new file 324 as text 326 and image 328. Text 306 and image 308 remain unchanged within the open instance of file 116 within application software 302, but are no longer visible as new file 324 is active and file generator program 200 changes the background of the selection window associated with content from transparent to a different background (e.g., reduced level of transparency, different background color, etc.) indicating the selection cannot be overwritten. However, text 310 is still visible as only the portion of file 116 within application software 302 corresponding with selection window 304 is obscured by new file 324. File generator program 200 updates presentation slide 312 to presentation slide 332 (e.g., preview pane) that corresponds to the content of new file 324, and includes text 326 and image 328 (e.g., content resides within new file 324).

In step 208, file generator program 200 edits the content within new file 118. In one embodiment, file generator program 200 edits the content in the selection window prior to saving to new file 118 (e.g., temporary file). In another embodiment, file generator program 200 edits the content in the selection window within a saved instance of new file 118 (e.g., directly edits the saved instance of new file 118 through the selection window). Through user interface 112, a user selects available formatting tools within application software 114 (e.g., bold, italic, indent, bullet, font size, etc.). File generator program 200 identifies the user selection within the formatting tools within application software 114. File generator program 200 applies the selected formatting tool to new file 118, thus allowing the user to edit new file 118 through application software 114 (i.e., enables the selected formatting tool to edit new file 118) and does not require another instance of application software 114 associated with the file type of new file 118 to be opened to enable editing. Additionally, the user, through user interface 112, may edit new file 118 directly (e.g., add and/or delete content). For example, the user adds additional text that was not part of the selection window and is not found within file 116. Additionally, the user may remove an image (e.g., image 328) from new file 118 in order to replace the image with another selection from file 116. As new file 118 is active, file generator program 200 only incorporates the editing changes within new file 118, and file 116 remains unchanged.

As depicted in the example of user interface 340 in FIG. 3C, file generator program 200 edits new file 324 and creates new file 344. Through user interface 112, the user selects text 326 and formatting tools within application software 302 associated with changing the text format from regular to bold italic. File generator program 200 identifies the selection of the formatting tool within application software 302, and applies the formatting to the user selection of text 326 (e.g., "Star light, star bright") and creates text 346 (e.g., "Star light, star bright"). Additionally the user selects image 328 and selects a fill option within application software 302. File generator program 200 identifies the selection of the fill tool, and the selected color, and changes image 328 (e.g., white star symbol) to image 348 (e.g., grey star symbol). File generator program 200 updates presentation slide 332 to presentation slide 352 that corresponds to the content of new file 344, and includes text 346 and image 348. As the editing changes were only applied to the content within new file 344, text 306 remains unchanged.

In decision 210, file generator program 200 determines whether an additional selection is to be made from file 116. In one embodiment, file generator program 200 determines the user moves the new file 118 (e.g., changes the location of the overlay), thus indicating an additional selection is to be made. In another embodiment, file generator program 200 receives a user selection through user interface 112 (e.g., icon, a toolbar, drop-down menu, and/or shortcut keys) that indicates an additional selection is to be made. In some other embodiment, file generator program 200 receives a user selection to create another instance of new file 118 and/or advance within new file 118 (e.g., add a new page, new slide, new worksheet, etc.), and determines an additional selection is to be made. In another embodiment, file generator program 200 receives an indication from a user through user interface 112 to exit and/or save new file 118 and file generator program 200 determines another selection is not to be made.

If file generator program 200 determines an additional selection is to be made from within file 116 (decision 210, yes branch), then file generator program 200 displays the selection window (step 202). If file generator program 200 determines an additional selection is not to be made from file 116 (decision 210, no branch), then file generator program 200 completes. Upon completion, file generator program 200 exits and/or saves new file 118 depending upon the user selection that file generator program 200 receives through user interface 112.

Figure 4:
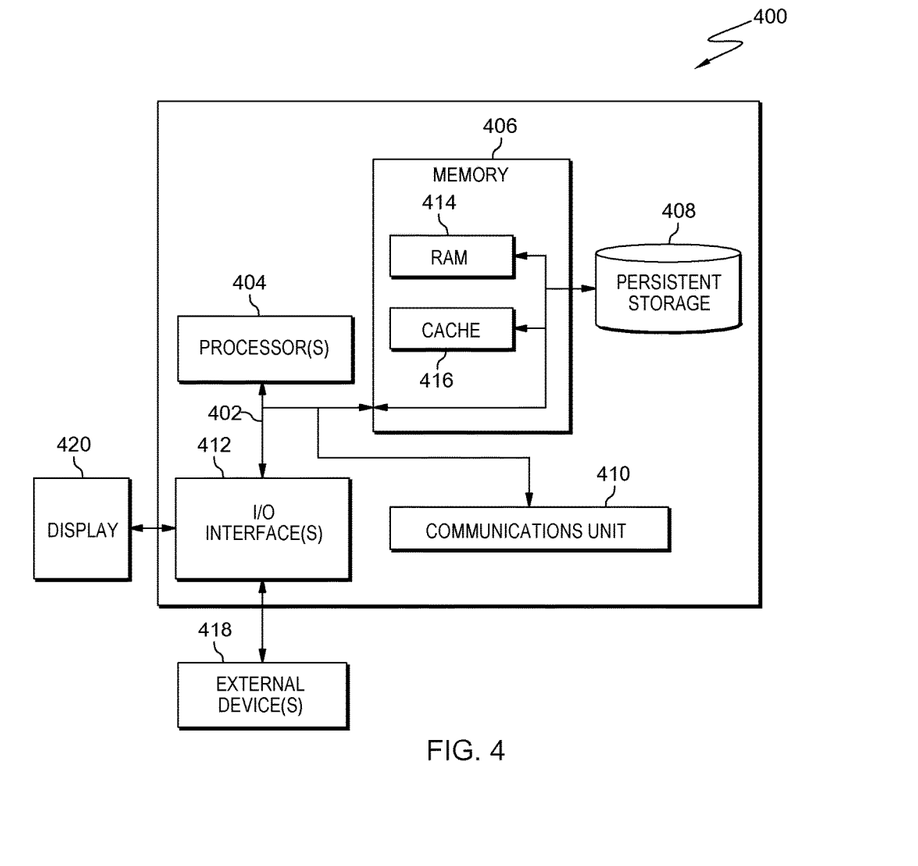
FIG. 4 is a block diagram of components of the computing device executing the file generator program, in accordance with an embodiment of the present invention.

FIG. 4 depicts a block diagram of components of computer 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer 400 includes communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM) 414. In general, memory 406 can include any suitable volatile or non-volatile computer readable storage media. Cache 416 is a fast memory that enhances the performance of computer processor(s) 404 by holding recently accessed data, and data near accessed data, from memory 406.

User interface 112, application software 114, file 116, new file 118, and file generator program 200 may be stored in persistent storage 408 and in memory 406 for execution and/or access by one or more of the respective computer processor(s) 404 via cache 416. In an embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. User interface 112, application software 114, file 116, new file 118, and file generator program 200 may be downloaded to persistent storage 408 through communications unit 410.

I/O interface(s) 412 allows for input and output of data with other devices that may be connected to computer 400. For example, I/O interface(s) 412 may provide a connection to external device(s) 418, such as a keyboard, a keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., user interface 112, application software 114, file 116, new file 118, and file generator program 200, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for generating a file, the method comprising:
    opening, by one or more computer processors, a first file within application software that includes content;
    receiving, by one or more computer processors, an indication to generate a second file based on the opened first file and an indication of a file format for the second file;
    providing, by one or more computer processors, a selection window associated with the second file, wherein the selection window is at least partially transparent and at least partially overlays the opened first file;
    identifying, by one or more computer processors, content within the first file that is overlaid by the provided selection window associated with the second file;
    transferring, by one or more computer processor, a copy of the identified content within the first file that is overlaid by the provided selection window associated with the second file; and
    wherein the opened first file does not incorporate changes that are made within the second file.

2. The method of claim 1, wherein identifying the content within the first file that is overlaid by the provided selection window associated with the second file further comprises:
    determining, by one or more computer processors, changes to the provided selection window, wherein the changes include one or more of changes to location of the provided selection window at least partially overlaying the opened first file and changes to a size of the provided selection window;
    identifying, by one or more computer processors, a transparent portion of the selection window; and
    identifying, by one or more computer processors, the content within the first file that is overlaid by the identified transparent portion of the selection window.

3. The method of claim 1, wherein transferring the copy of the identified content within the first file that is overlaid by the provided selection window associated with the second file further comprises:
    receiving, by one or more computer processors, an indication to copy the identified content within the first file that is overlaid by the provided selection window;
    selecting, by one or more computer processors, the identified content within the first file that is overlaid by the provided selection window based on the received indication to copy;
    initiating, by one or more computer processors, a copy, within the application software, of the selected identified content within the first file that is overlaid by the provided selection window;
    transferring, by one or more computer processors, the copy of selected identified content within the first file that is overlaid by the provided selection window to the second file;
    updating, by one or more computer processors, the transferred copy of selected identified content within the provided selection window to exclude on or more portions of content within the transferred copy of selected identified content that may not be replaced by changing one or more of the following: a font color, a background color, and a border of the one or more portions of content within the transferred copy of selected identified content; and
    editing, by one or more computer processors, the updated transferred copy of selected identified content within the second file.

4. The method of claim 3, wherein editing the updated transferred copy of the selected identified content within the second file further comprises:
    receiving, by one or more computer processors, a selection of a formatting tool within the application software associated with the opened first file;
    enabling, by one or more computer processors, the formatting tool based on the received selection within the second file;
    updating, by one or more computer processors, the updated transferred copy of the selected identified content within the second file based on changes associated with the enabled formatting tool; and determining, by one or more computer processors, whether a second selection of content from the opened first file is received.

5. The method of claim 4, further comprising:
responsive to determining that a second selection of content from the opened first file is received, identifying, by one or more computer processors, one or more portions within the second file that do not include one or more of: the updated transferred copy of the selected identified content and content added by a user;
updating, by one or more computer processors, the identified one or more portions within the second file to transparent; and
enabling, by one or more computer processors, a selection window that corresponds to the identified one or more portions that are transparent over the opened first file.

6. The method of claim 4, further comprising:
responsive to determining that a second selection of content from the opened first file is not received, saving, by one or more computer processors, the second file with a file format based on the received indication of the file format.

7. A computer program product for generating a file, the computer program product comprising:
one or more computer readable storage media and program instructions stored on the one or more computer readable storage media, the program instructions comprising:
program instructions to open a first file within application software that includes content;
program instructions to receive an indication to generate a second file based on the opened first file and an indication of a file format for the second file;
program instructions to provide a selection window associated with the second file, wherein the selection window is at least partially transparent and at least partially overlays the opened first file;
program instructions to identify content within the first file that is overlaid by the provided selection window associated with the second file; and
program instructions to transfer a copy of the identified content within the first file that is overlaid by the provided selection window associated with the second file; and
wherein the opened first file does not incorporate changes that are made within the second file.

8. The computer program product of claim 7, wherein to identify the content within the first file that is overlaid by the provided selection window associated with the second file further comprises one or more of the following program instructions, stored on the one or more computer readable storage media, to:
determine changes to the provided selection window, wherein the changes include one or more of changes to location of the provided selection window at least partially overlaying the opened first file and changes to a size of the provided selection window;
identify a transparent portion of the selection window; and
identify the content within the first file that is overlaid by the identified transparent portion of the selection window.

9. The computer program product of claim 7, wherein to transfer the copy of the identified content within the first file that is overlaid by the provided selection window associated with the second file further comprises one or more of the following program instructions, stored on the one or more computer readable storage media, to:
receive an indication to copy the identified content within the first file that is overlaid by the provided selection window;
select the identified content within the first file that is overlaid by the provided selection window based on the received indication to copy;
initiate a copy, within the application software, of the selected identified content within the first file that is overlaid by the provided selection window;
transfer the copy of selected identified content within the first file that is overlaid by the provided selection window to the second file;
update the transferred copy of selected identified content within the provided selection window to exclude on or more portions of content within the transferred copy of selected identified content that may not be replaced by changing one or more of the following: a font color, a background color, and a border of the one or more portions of content within the transferred copy of selected identified content; and
edit the updated transferred copy of selected identified content within the second file.

10. The computer program product of claim 9, wherein to edit the updated transferred copy of the selected identified content within the second file further comprises one or more of the following program instructions, stored on the one or more computer readable storage media, to:
receive a selection of a formatting tool within the application software associated with the opened first file;
enable the formatting tool based on the received selection within the second file;
update the updated transferred copy of the selected identified content within the second file based on changes associated with the enabled formatting tool; and
determine whether a second selection of content from the opened first file is received.

11. The computer program product of claim 10, further comprising one or more of the following program instructions, stored on the one or more computer readable storage media, to:
responsive to determining that a second selection of content from the opened first file is received, identify one or more portions within the second file that do not include one or more of:
the updated transferred copy of the selected identified content and content added by a user;
update the identified one or more portions within the second file to transparent; and
enable a selection window that corresponds to the identified one or more portions that are transparent over the opened first file.

12. The computer program product of claim 10, further comprising one or more of the following program instructions, stored on the one or more computer readable storage media, to:
responsive to determining that a second selection of content from the opened first file is not received, save the second file with a file format based on the received indication of the file format.

13. A computer system for generating a file, the computer system comprising:
one or more computer processors, one or more computer readable storage media, and program instructions stored on the computer readable storage media for execution by at least one of the one or more processors, the program instructions comprising:

program instructions to open a first file within application software that includes content;

program instructions to receive an indication to generate a second file based on the opened first file and an indication of a file format for the second file;

program instructions to provide a selection window associated with the second file, wherein the selection window is at least partially transparent and at least partially overlays the opened first file;

program instructions to identify content within the first file that is overlaid by the provided selection window associated with the second file; and program instructions to transfer a copy of the identified content within the first file that is overlaid by the provided selection window associated with the second file; and wherein the opened first file does not incorporate changes that are made within the second file.

14. The computer system of claim 13, wherein to identify the content within the first file that is overlaid by the provided selection window associated with the second file further comprises one or more of the following program instructions, stored on the one or more computer readable storage media, to:

determine changes to the provided selection window, wherein the changes include one or more of changes to location of the provided selection window at least partially overlaying the opened first file and changes to a size of the provided selection window; identify a transparent portion of the selection window; and identify the content within the first file that is overlaid by the identified transparent portion of the selection window.

15. The computer system of claim 13, wherein to transfer the copy of the identified content within the first file that is overlaid by the provided selection window associated with the second file further comprises one or more of the following program instructions, stored on the one or more computer readable storage media, to:

receive an indication to copy the identified content within the first file that is overlaid by the provided selection window;

select the identified content within the first file that is overlaid by the provided selection window based on the received indication to copy;

initiate a copy, within the application software, of the selected identified content within the first file that is overlaid by the provided selection window;

transfer the copy of selected identified content within the first file that is overlaid by the provided selection window to the second file;

update the transferred copy of selected identified content within the provided selection window to exclude on or more portions of content within the transferred copy of selected identified content that may not be replaced by changing one or more of the following: a font color, a background color, and a border of the one or more portions of content within the transferred copy of selected identified content; and edit the updated transferred copy of selected identified content within the second file.

16. The computer system of claim 15, wherein to edit the updated transferred copy of the selected identified content within the second file further comprises one or more of the following program instructions, stored on the one or more computer readable storage media, to:

receive a selection of a formatting tool within the application software associated with the opened first file;

enable the formatting tool based on the received selection within the second file;

update the updated transferred copy of the selected identified content within the second file based on changes associated with the enabled formatting tool; and determine whether a second selection of content from the opened first file is received.

17. The computer system of claim 16, further comprising one or more of the following program instructions, stored on the one or more computer readable storage media, to:

responsive to determining that a second selection of content from the opened first file is received, identify one or more portions within the second file that do not include one or more of:

the updated transferred copy of the selected identified content and content added by a user;

update the identified one or more portions within the second file to transparent; and enable a selection window that corresponds to the identified one or more portions that are transparent over the opened first file.

18. The computer system of claim 16, further comprising one or more of the following program instructions, stored on the one or more computer readable storage media, to:

responsive to determining that a second selection of content from the opened first file is not received, save the second file with a file format based on the received indication of the file format.

* * * * *